Nov. 23, 1954     C. S. LYNCH     2,695,283
METHOD OF FORMING UREA AND THIOUREA COMPLEXES
Filed Jan. 2, 1951
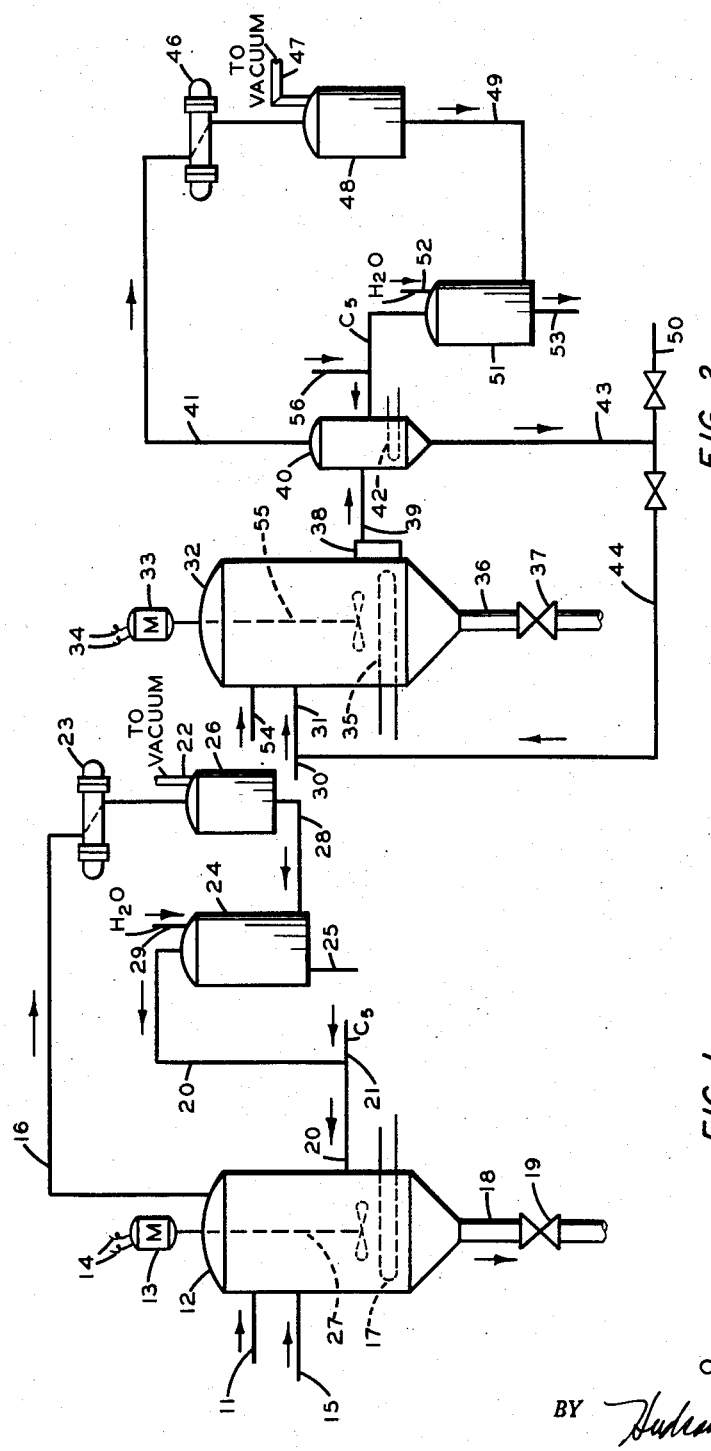
INVENTOR.
C.S. LYNCH
BY *Hudson W Young*
ATTORNEYS

United States Patent Office 2,695,283
Patented Nov. 23, 1954

2,695,283

METHOD OF FORMING UREA AND THIOUREA COMPLEXES

Charles S. Lynch, Bartlesville, Okla., assignor to Phillips Petroleum Company, a corporation of Delaware Application January 2, 1951, Serial No. 203,889

10 Claims. (Cl. 260—96.5)

This invention relates to a process for the separation of organic compounds. In one aspect, it relates to a process for the separation of a class of compounds characterized by straight carbon atom chains from admixture with another class of organic compounds characterized by branched carbon atom chains by the formation of adducts, either of the former with urea or of the latter with thiourea. In another aspect, it relates to a method for maintaining a high concentration of an amide in a reaction solution.

There has recently been discovered a process for the separation of organic compounds which process permits the separation of a class of compounds having one type of molecular arrangement from a class of compounds having a different type of molecular arrangement. Thus, straight-chain hydrocarbons can be separated, individually or as a class, from branched-chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cycloparaffins, irrespective of the boiling points of the various components of the mixture thereof. The adducts thus formed are readily recoverable by filtration or other suitable means from the organic compounds that do not form adducts with urea, and then the adducts are dissociated to recover the urea and the adduct-forming organic compounds.

While urea forms adducts with organic compounds having straight carbon atom chains, thiourea ($CS(NH_2)_2$) forms adducts with organic compounds having branched or cyclic carbon atom chains. Thus, the adduct-forming property of thiourea permits a ready separation of such organic compounds from organic compounds having straight carbon atom chains, since the latter do not form adducts with thiourea.

One of the well known methods for effecting the adduct formation reaction between urea or thiourea and an organic compound capable of forming an adduct therewith is to contact a solution of the amide with the said organic compound, or a mixture of organic compounds containing adduct formers. Solid crystalline adduct of the amide and the adduct-forming compound are precipitated, thus removing part of the amide from solution. There are many known solvents for urea or thiourea suitable for carrying out the process just described, but one of the most effective is methanol because of the high rate of reaction obtained using this solvent.

In the reaction involving the formation of urea or thiourea adducts by contacting a solution of the amide with a compound capable of forming adducts with said amide, reaction occurs only as long as urea or thiourea are present in the solution in relatively high concentration. For example, when methanol is used as a solvent for the urea, it is necessary to maintain a urea concentration of 70 to 80 per cent of saturation or more in order to promote formation of the addition product, depending on the nature of the other reactant, etc. When some of the urea has been removed from the methanol solution in the form of a crystalline adduct, it is necessary to add more urea to the solution or to cool the solution to a lower temperature so that further reaction may take place. As the concentration of the amide in methanol is lowered at constant temperature, the activity of the urea is lowered until a point is reached where no more reaction will occur. Thus, in order to promote adduct formation, it is quite necessary to maintain a high amide concentration in the methanol in order to maintain the activity of the urea. However, addition of solid urea involves handling additional solids and has the disadvantage that large amounts of urea are required in the process since the urea remaining dissolved in the solvent at the completion of the adduct formation reaction is not utilized to form adducts. As mentioned, the activity of the urea can also be increased by lowering the temperature of the reaction mixture as the reaction proceeds. However, with this method it is obviously not possible to maintain a constant temperature which is optimum for the particular reaction involved.

I have now discovered a method of maintaining a high concentration of an amide selected from urea or thiourea in solution in methanol during the reaction of said amide with an organic compound capable of forming an adduct therewith comprising adding n-pentane or isopentane to the reaction mixture, subjecting the mixture to distillation conditions at a temperature at which said adduct is formed, and recovering from this mixture an azeotrope of methanol and isopentane or n-pentane as the overhead distillation product and also recovering an adduct of said amide with the organic compound. By the present invention, the activity or concentration of the amide is maintained high by the removal of part of the solvent, methanol, from the reaction mixture during the reaction. An important feature of the invention is that the reaction can be kept at an optimum constant temperature while maintaining a high concentration of amide in the methanol without adding additional solid amide as amide is removed from solution by adduct formation.

One object of my invention is to device a new process for the production of urea or thiourea-organic compound adducts.

Another object of my invention is to provide a method for the rapid formation of such amide-organic compound addition products in hydrocarbon separation processes.

Still another object of my invention is to provide a method for maintaining the reaction mixture for the formation of urea and thiourea-hydrocarbon adducts in a highly reactive condition in a hydrocarbon separation process.

Yet another object of my invention is to provide a method for maintaining a high urea and thiourea concentration in methanol solutions when some of the urea or thiourea has been removed by crystalline adduct formation.

Still other objects and advantages of my invention will be realized upon reading the following description which, taken with the attached drawing, forms a part of this specification.

In the drawing, Figure 1 is a flow diagram in diagrammatic form representing one form of apparatus in which to practice the process of my invention. Figure 2 is a flow diagram representing another form of apparatus in which to carry out the process of my invention.

Referring to the drawing and specifically to Figure 1, reference numeral 12 refers to a reaction vessel in which the urea and adduct-forming compound are allowed to react to form an adduct. This vessel 12 will be termed a reaction vessel. For explanation purposes I will explain the operation of the apparatus of Figure 1 and of Figure 2 using urea as exemplary of an amide compound to which my process applies and using a hydrocarbon mixture containing adduct-forming straight-chain hydrocarbons as feed stock. While thiourea will operate in a manner equally well as will urea, I will use the urea merely for exemplary purposes. A saturated solution of the urea in methanol is introduced into the reaction vessel 12 through a charge line 11. A hydrocarbon charge stock containing one or more straight-chain hydrocarbons having more than 5 carbon atoms per molecule and other hydrocarbons is introduced into this reaction vessel 12 through a line 15. A stirrer 27 is provided for maintaining a state of agitation for intimate contacting within the reaction vessel. A coil 17 is provided in the bottom of vessel 12 for temperature adjustment purposes. Under certain conditions, it will be necessary to circulate through the coil 17 a fluid for heating purposes; while under other conditions, it will be necessary to circulate through this coil a cooling material in case the reaction mixture becomes too warm. A motor, for example, for convenience an electric motor 13, is provided to rotate the stirrer 27. The motor may receive energy for its operation through wires 14 from a source, not shown. A conduit 18 containing a valve 19 is for removal of material from the bottom of this reaction vessel 12. An overhead line 16 is provided for removing vaporous material from the top of the reaction vessel. Element 23 is a condenser, while vessel 26 is an accumulator vessel. Conduit 22 leads to a source of vacuum, not shown.

In the operation of apparatus of Figure 1, as mentioned above, through line 11 is charged a saturated solution of urea in methyl alcohol into the vessel 12. The hydrocarbon feed stock containing straight-chain hydrocarbons capable of forming adducts with urea is charged to reactor 12 through the line 15. The stirrer 27 is set into operation and when the temperature is properly adjusted in the reaction vessel, crystalline urea-hydrocarbon adduct begins to form. The reaction takes place and forms the adduct as long as the temperature is favorable and the concentration of urea in the methyl alcohol solvent is relatively high, for example, about 70 per cent or more. When the concentration of urea reaches a value as low as 70 per cent, the formation of further adduct ceases. I find that when n-pentane or isopentane is added to this reaction mixture and the mixture is subjected to distillation conditions an azeotropic mixture of methyl alcohol and the $C_5$ hydrocarbon may be removed through the overhead vapor line 16. By the use of one of the said $C_5$ paraffinic hydrocarbons as an azeotrope former, I am able to remove methanol from the reaction mixture and at the same time maintain the reaction solution at an adduct-forming temperature within the vessel 12. The temperature to be maintained in this reaction vessel 12 will, of course, depend upon the nature of the adduct-forming hydrocarbon of 5 carbon atoms per molecule or more used in the adduct formation reaction, but a temperature in the range from 40° to 100° F. is employed in the process. When n-pentane is used as the azeotrope former, the azeotropic mixture of n-pentane and methanol distills from the reaction vessel 12 at an overhead temperature of about 88° F. at atmospheric pressure. For control of reaction temperature under distillation conditions, a vacuum may be employed during the distillation of the azeotrope from the reaction mixture. To provide such distillation conditions, the vacuum may be applied through line 22 to the accumulator vessel 26. When isopentane is used as an azeotrope former in this operation, the azeotrope of isopentane and methanol distills at an overhead temperature of about 76° F. Thus, at atmospheric temperature when using isopentane a slightly lower temperature may be maintained within the reaction vessel 12 than when an equivalent amount of n-pentane is used. I find that when the reaction vessel 12 is charged with the urea-methanol solution and the feed hydrocarbons the concentration of the urea in the methanol can be maintained sufficiently high, preferably saturated, to promote continued operation or continued formation of adduct merely by removing some of the methanol continuously from the reaction mixture. As mentioned, I do this by adding isopentane or n-pentane and subjecting this reaction mixture to distillation conditions to remove some of the methanol. For a continuous supply of the said $C_5$ paraffinic hydrocarbon azeotrope-former, I can merely condense the azeotropic mixture taken overhead through the line 16 in the condenser 23. Condensate accumulates in vessel 26. When using n-pentane as azeotrope former and atmospheric distillation pressure, the condensate in the accumulator 26 contains about 91 weight per cent of the n-pentane. When using the isopentane as the azeotrope former and atmospheric distillation pressure, the condensate in the accumulator 26 contains about 96 weight per cent of the isopentane.

The $C_5$ hydrocarbon-methanol mixture from the accumulator 26 is passed through a line 28 into a separation zone 24, such as an extraction vessel. Since methanol is very soluble in water, this latter material serves as an excellent extraction agent for removing the methanol from the methanol-$C_5$ hydrocarbon solution. When extracting with water, the water, from a source not shown, is introduced through line 29 into this zone 24 and the methanol is extracted from solution with the $C_5$ hydrocarbon. The water solution of methanol is removed from this vessel through a line 25. When extracting with a solvent, such as water, the contacting zone is provided with conventional liquid-liquid contacting apparatus to promote intimate contact between the down-flowing water and the up-flowing hydrocarbon-methanol solution. By the time the specific pentane reaches the top of vessel 24 the methanol has been quite completely removed, and there issues from vessel 24 through line 20 the pentane. This hydrocarbon is passed on through line 20 into the main reaction vessel 12 for the formation of a further quantity of azeotrope for removal of the methanol from the reaction mixture. Any $C_5$ hydrocarbon needed for makeup purposes may be introduced into this system through a line 21 from a source, not shown. This operation as just described is continued until all or substantially all, or as nearly all as is desired, of the methanol is removed from the reaction mixture in vessel 12. When this condition is reached, then the re-addition of further quantities of said $C_5$ hydrocarbon is terminated, distillation is stopped, and the resulting reaction product from within vessel 12 is withdrawn through line 18 by opening valve 19. This reaction mixture consists mainly of the urea-hydrocarbon addition product in suspension or as a slurry with unreacted hydrocarbons and with some methanol when not all of the latter has been removed as azeotrope. In any event, the slurry removed through line 18 may be passed to a filter apparatus, not shown, in which the adduct is filtered from the remaining liquid. The solid adduct is one product of the process, while unreacted hydrocarbon may be recovered from the filtrate material as a second product of the process.

While the above description of the operation of the apparatus of Figure 1 is for a batch operation, this apparatus can also be operated in a continuous manner. When the apparatus of Figure 1 is used for continuous operation, a solution of urea in methanol is continuously introduced into the reaction vessel 12 through line 5 while a stream of hydrocarbon to be treated is introduced through line 15. The $C_5$ azeotrope former hydrocarbon is continuously added through line 20 while, at the same time, an azeotropic mixture of $C_5$ hydrocarbon and methanol is continuously removed through the overhead line 16. In this manner, slurry may be continuously removed through line 18 to a filter, not shown. In this filter, solid adduct is continuously removed from the slurry as a main product. Unreacted hydrocarbon may be recovered from the filtrate as a second product of the process. The operation as regards introduction of the azeotrope former and removal of the methanol-$C_5$ hydrocarbon azeotrope is similar to that described hereinabove. If water extraction is used for methanol recovery, the solution of methanol and water is withdrawn through line 25. The methanol may be recovered from the water by any known method. The methanol may then be used for dissolving additional quantities of urea and such a solution is reintroduced into the reaction zone 12 through the charge line 11. In this manner, the operation may be continued for any period of time desired.

In the apparatus of Figure 2 is illustrated a flow diagram somewhat similar to that just described in relation to Figure 1. The methanol-urea solution is introduced into a reaction vessel 32 through charge lines 30 and 31. The hydrocarbon feed for use in the formation of adduct is introduced through line 54. Heating or cooling of the reaction mixture is by means of a heat exchange coil 35. Electrical energy from wires 34 and from a source, not shown, powers motor 33 for rotating the stirrer apparatus 55. Within this vessel the addition product of urea and hydrocarbon forms. Element 38 is a filter apparatus which is intended to remove by filtration some of the filtrate and leave in the reaction vessel 32 the solid adduct as it is formed. The filtrate removed through line 39 is passed to a distillation apparatus 40 in which n-pentane or isopentane is added as azeotrope former through a line 45. Heat as necessary is supplied through the coil 42 for operation of still 40, and there is taken overhead from this still through a vapor line 41 a vaporous azeotropic mixture of methanol and said $C_5$ hydrocarbon. This vaporous azeotrope is condensed in condenser 46 and condensate accumulates in vessel 48. If it is necessary to maintain this distillation operation under reduced pressure for temperature reasons, a vacuum from a source, not shown, is applied through a line 47. Condensate from the accumulator 48 is passed through a line 49 into a separation zone 51. If water is used as an extractant, some water, from a source not shown, is introduced into the top of the zone through a line 52. Removed from the bottom of this zone through a line 53 is a methanol-water solution. The $C_5$ hydrocarbon is removed through the overhead line 45 for reintroduction to the azeotrope still 40. The still bottoms from this azeotrope still which contain methanol, urea, adduct, and feed hydrocarbons is removed through the bottom drawoff line 43. This material is recirculated through a line 44 and through line 31 into the main reaction zone 32. Thus, by the removal of filtrate and removal from the filtrate of a portion of the methanol content and the reintroduction of the remaining methanol, urea, and adduct into the reaction zone, the concentration of the urea in the reaction mixture in vessel 32 is maintained high above a value, preferably saturated, at which the formation of the addition product can be produced. Makeup methanol for use in the operation may be introduced into the system through line 30 or through line 50, as desired.

Although the concept of this invention is applicable to a process for forming an aduct of any compound capable of forming an adduct with an amide selected from the group consisting of urea and thiourea and to a process for the separation of any compound capable of forming an adduct with urea or thiourea from admixture with a compound not capable of forming such adduct with urea or thiourea under the conditions employed in the adduct-forming zone, a general description of the types of compounds which do and do not form adducts will be given in order to illustrate better the applicability of the process of this invention.

In general, an adduct can be formed by contacting a straight carbon atom chain organic compound with urea in the presence of an activator-solvent, such as methanol, water, or the like. Alternatively, a branched carbon atom chain compound can be contacted with thiourea in the presence of such an activator-solvent to produce an adduct. The straight-chain compound can be admixed with a branched-chain organic compound, the latter of which, in general, do not form adducts with urea. The straight-chain compound can comprise one or more of a normal alkane or alkene hydrocarbon having from 6 to 50 carbon atoms in the molecule, such as hexane, the hexenes, heptane, and heptenes, octane, the octenes, nonane, the nonenes, decane, the decenes and progressively higher molecular alkanes and alkenes including those having 50 carbon atoms. The straight-carbon atom chain compound can also be a primary alcohol having from 6 to 50 carbon aotms and being saturated or unsaturated and thus corresponds in carbon atom configuration to the straight-chain hydrocarbons above-mentioned. Urea will also form adducts with such straight carbon atom chain compounds as primary amines having from 6 to 50 carbon atoms per molecule, mercaptans having from 6 to 50 carbon atoms per molecule, ketones having from 3 to 50 carbon atoms per molecule, esters of organic acids having from 5 to 50 carbon atoms per molecule, and organic acids having from 4 to 50 carbon atoms per molecule.

Urea does not form adducts with branched carbon atom chain organic compounds nor with cyclic or aromatic organic compounds such as isohexane, methyloctane, cyclohexane, benzene, toluene and cymene. When employing urea in a process of this invention to separate an adduct-forming straight-chain compound from a non-adduct-forming branched-chain or cyclic compound, any one or more of the straight carbon atom organic compounds illustrated above can be admixed with one or more of the non-adduct-forming compounds.

Thiourea forms adducts with branched carbon atom chain organic compounds but does not form adducts with straight carbon atoms chain organic compounds nor with aromatic compounds. Thus, adduct-forming power of thiourea is substantially opposite to that of urea in that the thiourea forms adducts with branched-chain organic compounds and not with straight-chain organic compounds, while urea forms adducts with the straight-chain organic compounds but not with the branched-chain organic compounds. Thus, thiourea can form adducts with such compounds as the branched carbon atom chain alkane and alkene hydrocarbons having from 5 to 50 carbon atoms in the straight-chain portion of the molecule and from 1 to 20 carbon atoms in a side chain. Illustrative of such compounds are isohexane, ethylhexane, isohexene, isoheptane, isoheptene, ethylheptane, ethylcyclooctane, trimethylnonane, cyclohexane, cyclooctane, and methylcyclohexane. Thiourea also forms an adduct with a secondary or tertiary alcohol having from 5 to 50 carbon atoms in the straight-chain portion of the molecule and from 1 to 20 carbon atoms in the side chain; with a secondary and tertiary amine having at least 7 carbon atoms per molecule, with a mercaptan having from 5 to 50 carbon atoms in the straight-chain portion of the molecule and from 1 to 20 carbon atoms in a side chain; and with a ketone having from 5 to 50 carbon atoms in the straight-chain portion of the molecule and 1 to 20 carbon atoms in a side chain. Thiourea also forms an adduct with various cycloparaffins having at least 6 carbon atoms in the cyclic portion of the molecule and which can or cannot contain various side chains containing one or more carbon atoms per chain, such as cyclohexane, cycloheptane, cyclooctane, cyclononane, methylcyclohexane, and dimethylcyclooctane. Thiourea can be employed as the adduct-forming material to separate a mixture of one or more compounds which form adducts therewith from one or more compounds which do not form adducts with thiourea. Further, the process of this invention is applicable to the separation of an organic compound capable of forming an adduct under the particular conditions employed in an adduct-forming zone from an organic compound not capable of forming a solid adduct under those conditions even though the latter can form an adduct under conditions other than those obtaining in the adduct-forming zone. Thus, a longer chain normal paraffin such as decane will form an adduct with urea at a higher temperature than will a shorter chain normal paraffin such as heptane. Hence, a mixture of longer chain and shorter chain hydrocarbons, e. g., decane and heptane, can be separated by employing an adduct-forming temperature above that of heptane but below that of decane.

The urea adducts that are produced according to the process of my invention contain more than three moles of urea per mol of organic compound, and the thiourea adducts contain more than two mols of thiourea per mol of organic compound.

In general, the temperature at which the adduct is formed is below the temperature at which the adduct decomposes, and this latter temperature is dependent upon the number of carbon atoms in the organic compound adducted with the amide. The thermal stability of the adduct increases as the number of carbon atoms in the adduct with the amide increases. The adduct-forming temperature is usually not above 175° F., and a temperature within the range of minus 70 to 130° F., preferably from 40 to 100° F., is ordinarily employed. According to the process of my invention I am able to hold the reaction temperature at a substantially constant optimum value in the preferred reaction temperature range, and this is the temperature range to which my invention applies. The temperature at which the adduct decomposes is higher than the adduct-forming temperature and is within the range of 80° to 200° F., preferably from 130° to 180° F., although higher temperatures up to the melting point of urea (271° F.) or thiourea (356° F.), as the case may be, can be employed. The amount of amide employed to form the adduct is variable, and ordinarily a mol ratio of amide to organic compound reactive therewith within the range of 1:1 to 20:1 is used.

While the invention has been described in connection with the present, preferred embodiments thereof, it is to be understood that the hereinbefore given descriptions are illustrative only and are not intended to limit the invention, the scope of which is defined by the appended claims.

I claim:

1. A method for producing a urea-straight chain hydrocarbon adduct from a methanol solution of urea and a straight chain hydrocarbon having more than 5 carbon atoms per molecule comprising mixing a straight chain hydrocarbon having more than 5 carbon atoms per molecule with a methanol solution of urea at a temperature below the decomposition temperature of said urea-straight chain hydrocarbon adduct and between the limits of $-70°$ and $+175°$ F., admixing with this mixture a $C_5$ paraffinic hydrocarbon selected from the group consisting of n-pentane and isopentane, distilling this admixture at a temperature below the decomposition temperature of said urea-straight chain hydrocarbon adduct and between said temperature limits and recovering an azetrope of methanol and said $C_5$ paraffinic hydrocarbon as distillate and a urea-straight chain hydrocarbon adduct from the distillation residue.

2. A method for separating a normal paraffinic hydrocarbon containing more than 5 carbon atoms per molecule from admixture with a non-urea adduct forming hydrocarbon comprising mixing with an admixture of said hydrocarbons a methanol solution of urea, adding to this mixture a $C_5$ paraffin hydrocarbon, distilling the mixture at a temperature below the decomposition temperature of an adduct of urea and said normal paraffinic hydrocarbon and below 100° F. to produce a distillate of an azeotrope of said $C_5$ paraffin hydrocarbon and a portion of the methanol thereby increasing the urea concentration in the residual methanol, removing from the distillation residue a urea-normal paraffin adduct as one product of the process and said non-adduct forming hydrocarbon as a second product.

3. A method for separating a branched-chain hydrocarbon containing more than 4 carbon atoms per molecule from admixture with a non-thiourea adduct forming hydrocarbon comprising admixing with a mixture of said hydrocarbons a methanol solution of thiourea, adding to this admixture a $C_5$ paraffin hydrocarbon, distilling the admixture at a temperature below the decomposition temperature of an adduct of thiourea and said branched-chain hydrocarbon and below 100° F. to produce a distillate of an azeotrope of said $C_5$ paraffin hydrocarbon and a portion of the methanol thereby increasing the thiourea concentration in the residual methanol, removing from the distillation residue a thiourea-branched-chain hydrocarbon adduct as one product of the process and said non-adduct forming hydrocarbon as a second product.

4. The process of claim 2 wherein the $C_5$ paraffin hydrocarbon is n-pentane.

5. The process of claim 2 wherein the $C_5$ paraffin hydrocarbon is isopentane.

6. The process of claim 3 wherein the $C_5$ paraffin hydrocarbon is n-pentane.

7. The process of claim 3 wherein the $C_5$ paraffin hydrocarbon is isopentane.

8. A method for producing a urea-organic compound adduct from a methanol solution of urea and an organic compound capable of forming an adduct with urea comprising mixing said organic compound with a methanol solution of urea at a temperature below the decomposition temperature of an adduct of urea and said organic compound and within the temperature limits of $-70°$ and $+175°$ F. whereby an adduct forms, admixing with this mixture a $C_5$ paraffinic hydrocarbon selected from the group consisting of n-pentane and isopentane, distilling this admixture at a temperature below the decomposition temperature of the adduct so formed and within the limits of $-70°$ and $+175°$ F. and recovering an azeotrope of methanol and said $C_5$ paraffinic hydrocarbon from the distillate and said adduct from the distillate residue.

9. A method for producing an adduct from a methanol solution of an amide selected from the group of amides consisting of urea and thiourea and an organic compound capable of forming an adduct with said amide comprising mixing said organic compound with said methanol solution of said amide at a temperature below the decomposition temperature of said adduct and within the range of $-70°$ and $+175°$ F. whereby an adduct forms, admixing with this mixture a $C_5$ paraffinic hydrocarbon, distilling this admixture at a temperature below the decomposition temperature of said adduct and within the range of $-70°$ and $+175°$ F. and recovering from the distillate an azeotrope of methanol and said $C_5$ paraffinic hydrocarbon and recovering said adduct from the distillation residue.

10. A method for separating a normal olefinic hydrocarbon containing more than 5 carbon atoms per molecule from admixture with a non-urea adduct forming hydrocarbon comprising mixing with an admixture of said hydrocarbons a methanol solution of urea, adding to this mixture a $C_5$ paraffin hydrocarbon, distilling this mixture at a temperature below the decomposition temperature of a urea adduct of said normal olefinic hydrocarbon and below 100° F. and producing a distillate of an azeotrope of said $C_5$ paraffin hydrocarbon and methanol thereby increasing the urea concentration in the residual methanol, recovering from the distillation residue a urea-straight chain-olefin adduct as one product of the process and said non-adduct forming hydrocarbon as a second product.

References Cited in the file of this patent

UNITED STATES PATENTS

| Number | Name | Date |
|---|---|---|
| 2,341,433 | Fisher | Feb. 8, 1944 |
| 2,406,561 | Rehberg | Aug. 27, 1946 |
| 2,499,820 | Fetterly | Mar. 7, 1950 |
| 2,604,430 | Skelton et al. | July 22, 1952 |

OTHER REFERENCES

Australian Application 17339/47, available February 12, 1948.

Lecat, Tables Azeotropiques, 2nd Ed., vol. 1 (1949), page 87.